United States Patent
Bolhofer et al.

[15] 3,691,166

[45] *Sept. 12, 1972

[54] SUBSTITUTED QUINOXALINES

[72] Inventors: William A. Bolhofer, Frederick; John J. Baldwin, Lansdale, both of Pa.

[73] Assignee: Merck & Co., Inc., Rahway, N.J.

[*] Notice: The portion of the term of this patent subsequent to May 5, 1987, has been disclaimed.

[22] Filed: Dec. 19, 1969

[21] Appl. No.: 886,791

[52] U.S. Cl. ..............................260/250 R, 424/250
[51] Int. Cl. ..............................................C07d 51/78
[58] Field of Search ..................................260/250 R

[56] References Cited

UNITED STATES PATENTS 3,510,487   5/1970   Bolhofer et al. .......260/250 R

OTHER PUBLICATIONS

Jirou, Chemical Abstracts Vol. 59 p 111700h

*Primary Examiner*—Nicholas S. Rizzo
*Attorney*—J. Jerome Behan, John Frederick Gerkens and I. Louis Wolk

[57] ABSTRACT

Novel 2,3-dichloro-5 or 6-hydroxyethylcarbamoylquinoxalines, further substituted with methyl and chloro radicals are disclosed, along with processes for their preparation. These compounds are prepared by the cyclization of a substituted diamino benzoic acid with diethyl oxalate, treating the dihydroxyquinoxalinecarboxylic acid obtained with phosphorus pentachloride in phosphorus oxy-chloride, which is reacted with ethanolamine to obtain the product. Compositions using these compounds as the active ingredient for the inhibition of gastric acidity are also disclosed.

4 Claims, No Drawings

SUBSTITUTED QUINOXALINES

This invention is concerned with novel quinoxaline compounds and with methods for their preparation.

A select group of heretofore unknown quinoxaline compounds has been found which possess the unique property of inhibiting gastric secretion in mammals. The preferred products heretofore and currently used to control gastric acidity are mainly either anticholinergic agents or antacids. The anticholinergic agents have the disadvantage of acting through the nervous system, and because of this other secretory functions of the body stimulated by the nervous system are affected. The antacid compounds however, only neutralize acid after it is formed and have a short duration of activity.

The quinoxaline compounds of this invention do not act by either of the above mechanisms and thus afford a new approach to acid inhibition as they control acid production at the gastric mucosa cellular level. Pharmacological studies indicate that the quinoxalines of this invention affect inhibition at the enzyme level and in addition are effective in inhibiting histamine stimulated gastric secretion, an important property not shared with other types of gastric acid inhibitors.

The novel compounds of this invention that have been found to possess this property of inhibiting gastric secretion to a marked degree are 2,3-dichloroquinoxaline compounds that contain a hydroxyethylcarbamoyl radical in the 5 or 6 position and are further substituted with a methyl or a chloro radical as discussed below.

The compounds of this invention may be represented by the following general formulas:

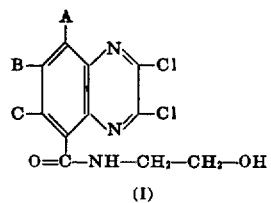

(I)

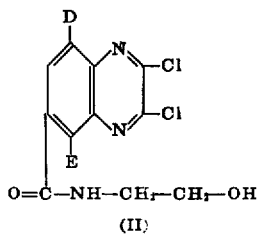

(II)

In formula I, A is methyl, chloro, or hydrogen, B is methyl, chloro, or hydrogen, and C is chloro or hydrogen, provided that one and only one of A, B, and C is other than hydrogen.

In formula II, D represents methyl, chloro, or hydrogen, and E is chloro or hydrogen, provided that one and only one of D and E is other than hydrogen.

Representative examples of the 2,3-dichloroquinoxaline compounds of this invention are: 2,3-dichloro-5-(2-hydroxyethylcarbamoyl)-7-methylquinoxaline; 2,3-dichloro-5-(2-hydroxyethylcarbamoyl)-8-methylquinoxaline; 5-(2-hydroxyethylcarbamoyl)-2,3,6-trichloroquinoxaline; 2,3-dichloro-6-(2-hydroxyethylcarbamoyl)-8-methylquinoxaline; and 6-(2-hydroxyethylcarbamoyl)-2,3,8-trichloroquinoxaline.

The preferred embodiments of the novel compounds of the invention are 5(2-hydroxyethylcarbamoyl)-2,3,6-trichloroquinoxaline and 6-(2-hydroxyethylcarbamoyl)-2,3,8-trichloroquinoxaline.

These substituted quinoxalines may advantageously be prepared from the appropriately substituted 2,3-dichloro-5 (or 6)-chlorocarbonylquinoxaline which in turn is prepared from the appropriately substituted 5 (or 6)-carboxy-2,3-dihydroxyquinoxaline by reaction of the latter substance with phosphorus pentachloride in phosphorus oxychloride. The dihydroxyquinoxaline is prepared by reacting an appropriately substituted diamino benzoic acid, in which the amino functions are ortho to one another, with diethyl oxalate. The chlorocarbonyl-quinoxaline is reacted with ethanolamine as illustrated below, using the 5-chlorocarbonyl compound as a representative example, it being understood that the reaction sequence is the same in making the 6-chlorocarbonyl compounds of formula II above.

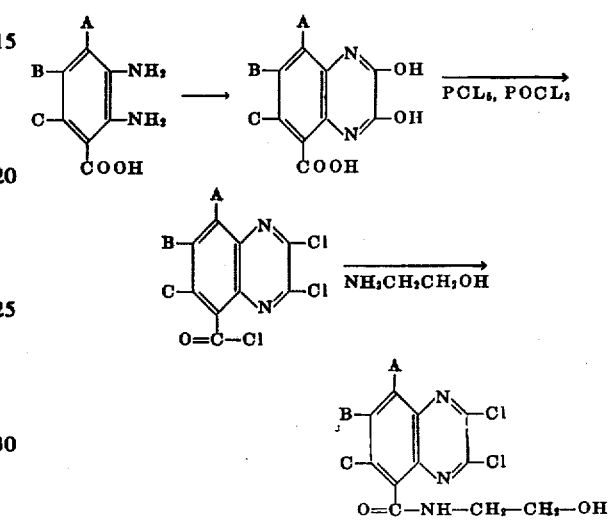

where A, B, and C are as defined above.

The process for the preparation of the hydroxyethylcarbamoyl compounds of formulas I and II above from the corresponding chlorocarbonyl compound and ethanolamine is carried out substantially at room temperature although higher or lower temperatures may be used if desired depending on the degree of reactivity of the two reactants.

The preferred embodiment of this invention utilizes a solvent although the reaction will proceed without one. If a solvent is desired, suitable ones include dioxane, ethyl ether, benzene, tetrahydrofuran, toluene, and the like.

The novel compounds of this invention effectively inhibit acid secretion for a period of hours. For this reason these substances have value in the prophylaxis and treatment of peptic ulcers. While the preferred dose is a function of the specific compound used and the individual requirements, generally the compounds of this invention are administered in a total daily dose of from about 0.5 to 500 mg., the preferred dose level being from 1 to 100 mg. At the recommended doses these compounds have a very favorable therapeutic ratio.

As the compounds contemplated within the scope of this invention are effective upon oral administration, they can be compounded with a pharmaceutical carrier in any suitable oral dosage form, as in a tablet, capsule suspension, or other liquid or solid form, that can be prepared by procedures well known in the art. Thus, these novel compounds may be admixed with a suitable diluent such as lactose, and encapsulated, or they may be combined with suitable binding agents and expanding agents and compressed into tablet form. In addition, a liquid pharmaceutical preparation may be obtained by dissolving or suspending the compounds in a suitably flavored vehicle. While the compounds are also active upon parenteral administration, the oral route is generally preferred.

Typical formulations for preparing tablets, capsules, and liquids containing quinoxalines of formulas I and II are described below. It should be recognized by one skilled in the art that the formulations represent a typical method for making the desired pharmaceutical composition. Factors such as the desired size of the tablet or capsule will be a determining factor as to the amount of diluent required. The type of diluent will be determined by the hardness of the tablet desired, and whether it is to be made by the wet, dry, or direct compression methods. Also to be considered is whether other active ingredients are to be included in the formulation, which may be of benefit in controlling hypergastric acidity in a secondary manner, such as the barbiturates and tranquilizers and the like.

Tablet containing 6-(2-hydroxyethylcarbamoyl)-2,3,8-trichloroquinoxaline

|  | Each Tablet | 1,000 Tablets |
| --- | --- | --- |
| 6-(2-hydroxyethylcar-bamoyl)-2,3,8-trichloroquinoxaline | 25 mg. | 25 gm. |
| Starch | 20 mg. | 20 gm. |
| Lactose (powder) | 20 mg. | 20 gm. |
| Talc | 5 mg. | 5 gm. |
| Wt. of granulation | 70 mg. | 70 gm. |

Mix all of the ingredients and then compress into slugs. The slugs should then be ground to form granules that will pass through a 14–16 mesh screen. The granules may then be recompressed into tablets, each weighing 70 mg.

Capsule containing 5-(2-hydroxyethylcarbamoyl)-2,3,6-trichloroquinoxaline

| 5-(2-hydroxyethylcarbamoyl)-2,3,6-trichloroquinoxaline | 50 mg. |
| --- | --- |
| Lactose | 150 mg. |
| Total: | 200 mg. |

Mix the ingredients so as to evenly distribute the active ingredient throughout the lactose. Pack the powder into No. 2 empty gelatin capsules. Each capsule should have a net weight of 200 mg.

The following examples are presented so that the process of the invention might be more fully understood, but the examples are not to be considered as limitative.

EXAMPLE 1

5-(2-Hydroxyethylcarbamoyl)-2,3,6-trichloroquinoxaline

A. A solution of 4.4 g (0.024 m) of 2,3-diamino-6-chlorobenzoic acid in 43 g (0.3 m, 40 ml) of diethyl oxalate is heated at reflux temperature for 3 hours. The reaction is then allowed to stand at room temperature for 18 hours and is then filtered to remove the solid 5-carboxy-6-chloro-2,3-dihydroxyquinoxaline which is washed with ether and used as is in the next reaction.

B. To a mixture of 16.6 g (0.08 m) of phosphorus pentachloride and 33.5 g (0.22 m, 20 ml) of phosphorus oxychloride there is added 4.4 g (0.02 m) of 5-carboxy-6-chloro-2,3-dihydroxyquinoxaline. The mixture is heated to reflux and maintained at that temperature for four hours. The reaction mixture is then concentrated in vacuo and ice is added to the residue in sufficient quantity to decompose any remaining chlorinating agent. The suspension is then filtered and the solid material extracted with hexane. The hexane solution is dried over sodium sulfate and evaporated to dryness to afford 2.0 g of 5-chlorocarbonyl-2,3,6-trichloroquinoxaline.

C. 2.3 g. (0.0073 m) of 5-chlorocarbonyl-2,3,6-trichloroquinoxaline is dissolved in 17 ml of dioxane. To this solution is added 0.96 g (0.015 m) of ethanolamine in 3 ml. of dioxane. When the addition is complete the reaction mixture is stirred for 30 minutes at room temperature. Sufficient water is added to cause precipitation. The resulting suspension is filtered, and the solid material recrystallized from acetonitrile to yield 5-(2-hydroxyethylcarbamoyl)-2,3,6-trichloroquinoxaline melting at 99° to 201° C.

EXAMPLE 2

5-(2-Hydroxyethylcarbamoyl)-2,3,7-trichloroquinoxaline

A. 10 g. of 2-amino-5-chloro-3-nitrobenzoic acid in 1500 ml. of ethanol is hydrogenated at room temperature over 5 percent palladium-on-carbon catalyst. When the required amount of hydrogen is taken up, the hydrogenation is stopped and the catalyst removed by filtration. The filtrate is concentrated to dryness in vacuo to yield about 7 g. of 5-chloro-2,3-diaminobenzoic acid.

B. 4.4 g. of 5-chloro-2,3-diaminobenzoic acid is reacted with 43 g. of diethyl oxalate as described in Example 1A to afford 5-carboxy-7-chloro-2,3-dihydroxyquinoxaline, which latter material is treated with phosphorus pentachloride-phosphorus oxychloride by the method of Example 1B to produce 5-chlorocarbonyl-2,3,7-trichloroquinoxaline.

C. 2.3 g. of 5-chlorocarbonyl-2,3,7-trichloroquinoxaline is reacted with 0.96 g. of ethanolamine in dioxane by the method of Example 1C to produce 5-(2-hydroxyethylcarbamoyl)-2,3,7-trichloroquinoxaline.

EXAMPLE 3

5-(2-Hydroxyethylcarbamoyl)-2,3,8-trichloroquinoxaline

A. To a solution of 7.6 g. of 3-chloro-6-methyl-2-nitroacetanilide in 25 ml. of pyridine and 19.5 ml. of water at 90° C. there is added 13.2 g. of potassium permangamate in six equal portions over a six hour period. After the permangamate addition is complete the mixture is stirred for one hour and then filtered. The filtrate is concentrated in vacuo to a solid containing 6.8 g. of 2-acetamido-4-chloro-3-nitrobenzoic acid melting above 300° C.

5.8 g. of this latter product in 75 ml. of constant boiling hydrochloric acid is refluxed for two hours. The mixture is then cooled and the resulting solid separated by filtration and recrystallized from toluene to afford 2- amino-4-chloro-3-nitrobenzoic acid, m.p. 240° to 241° C.

B. Following the procedure of Example 2, 2-amino-4-chloro-3-nitrobenzoic acid is catalytically hydrogenated to 4-chloro-2,3-diaminobenzoic acid, the latter product reacted with diethyl oxalate to give 5-carboxy-8-chloro-2,3-dihydroxyquinoxaline, this material is chlorinated to 5-chlorocarbonyl-2,3,8-trichloroquinoxaline, and finally this chlorocarbonyl compound treated with ethanolamine to produce 5-(2-hydroxyethylcarbamoyl)-2,3,8-trichloroquinoxaline.

EXAMPLE 4

2,3-Dichloro-5-(2-hydroxyethylcarbamoyl)-7-methylquinoxaline

A. A solution of 5 grams of 2-amino-5-methyl-3-nitrobenzoic acid in 250 ml. of methanol is hydrogenated at about room temperature in the presence of 5 percent palladium-on-carbon catalyst. When the reduction is complete, the catalyst is removed by filtration and the filtrate concentrated to dryness under reduced pressure to yield a residue of 2,3-diamino-5-methylbenzoic acid.

B. Four grams of 2,3-diamino-5-methylbenzoic acid in 40 ml. of diethyloxalate is refluxed for three hours. The mixture is then allowed to stand at room temperature for 18 hours and the resulting solid is separated by filtration, washed with ethyl ether and dried to afford 4 grams of 5-carboxy-2,3-dihydroxy-7-methylquinoxaline which melts above 300° C. This product is added without further purification to a mixture of 16.6 grams of phosphorus pentachloride and 20 ml. of phosphorus oxychloride and the entire mixture refluxed for four hours. It is then concentrated under reduced pressure and ice added to the residue in order to decompose any remaining chlorinating agent. The mixture is filtered and the solids extracted with hexane. The hexane extract is concentrated to dryness to afford 5-chlorocarbonyl-2,3-dichloro-7-methylquinoxaline.

C. To 2 grams of the acid chloride obtained in part B in 17 ml. of dioxane is added with stirring 0.96 g. of ethanolamine in 3 ml. of dioxane, and the mixture stirred for 30 minutes at room temperature. Water is then added to precipitate 2,3-dichloro-5-(2-hydroxyethylcarbamoyl)7-methyl-quinoxaline. This product is recovered by filtration and recrystallized to afford substantially pure material, m.p. 188°–190° C.

EXAMPLE 5

2,3-Dichloro-5-(2-hydroxyethylcarbamoyl)-8-methylquinoxaline

A. A solution of 10 g. of 3-acetamido-4-methyl-2-nitrobenzoic acid in 100 ml. of 20 percent sulfuric acid is refluxed for 105 minutes. The mixture is then cooled to about room temperature and the resulting solid separated by filtration. It is recrystallized from water to afford 7.7 g. of 3-amino-4-methyl-2-nitrobenzoic acid, m.p. 173°–175° C.

Five grams of the above product are dissolved in 200 ml. of ethanol and hydrogenated in the presence of 5 percent palladium-on-charcoal catalyst until the necessary amount of hydrogen is taken up. At the end of this time the catalyst is separated by filtration and the filtrate concentrated in vacuo to dryness to yield 2,3-diamino-4-methyl-benzoic acid.

B. The 2,3-diamino-4-methylbenzoic acid obtained as described above is converted by the procedures of Examples 4B and 4C to 2,3-dichloro-5-(2-hydroxyethyl-carbamoyl)-8-methylquinoxaline, m.p. 142°–147° C.

EXAMPLE 6

2,3-Dichloro-6-(2-hydroxyethylcarbamoyl)-8-methylquinoxaline

A. A suspension of 28 g. of 4-amino-3-methylbenzoic acid in 100 ml. of acetic anhydride is heated for one hour at 100° C. Water is added to decompose excess acetic anhydride and the resulting solid filtered and recrystallized from acetonitrile to give 28 grams of 4-acetamido-3-methylbenzoic acid, m.p. 235°–237° C. 19 grams of this material is added to 70 ml. of 90 percent nitric acid at a temperature of 3°–6° C. The resulting mixture is stirred for 45 minutes at 5° C. and then allowed to warm to room temperature. It is poured into water and the resulting solid filtered and recrystallized from acetonitrile to afford 17.5 g. of 4-acetamido-5-methyl-3-nitrobenzoic acid, m.p. 267° C.

A suspension of 6 g. of the immediately preceding product in 60 ml. of 20 percent hydrochloric acid is refluxed for 2 hours. The mixture is then cooled to about room temperature and the solid filtered and recrystallized from 90 percent aceto-nitrile to yield 5 g. of 4-amino-5-methyl-3-nitrobenzoic acid, m.p. 279°–280° C. 4.5 grams of this material in 200 ml. of ethanol is hydrogenated in the presence of 5 percent palladium-on-charcoal catalyst. When the reduction is complete, the catalyst is removed by filtration and the solution concentrated in vacuo to dryness to yield 4 g. of 3,4-diamino-5-methylbenzoic acid.

B. 4 grams of 3,4-diamino-5-methylbenzoic acid in 40 ml. of diethyloxalate is refluxed for three hours and then allowed to stand at room temperature for 18 hours. The resulting solid is filtered, washed with ether and dried to give 6-carboxy-2,3-dihydroxy-8-methylquinoxaline which melts above 300° C.

4.4 grams of the above dihydroxyquinoxaline is added to a mixture of 16.6 g. of phosphorus pentachloride and 20 ml. of phosphorus oxychloride and the mixture refluxed for four hours. It is then cooled and concentrated to a residue under reduced pressure. Ice is added to decompose any excess chlorinating agent and the solid filtered. The solid product is extracted with hexane, and the hexane solution concentrated to dryness to yield 2 g. of 6-chlorocarbonyl-2,3-dichloro-8-methylquinoxaline, m.p. 88°–90° C.

C. To 2 g. of the foregoing acid chloride in 17 ml. of dioxane is added with stirring 0.96 g. of ethanolamine in 3 ml. of dioxane. The mixture is stirred for 30 minutes at room temperature, and water is then added to cause precipitation. The resulting solid is filtered and recrystallized from acetonitrile to give 2 g. of 2,3-dichloro-6-(2-hydroxyethylcarbamoyl)-8-methylquinoxaline, m.p. 175°–176.5° C.

EXAMPLE 7

6-(2-Hydroxyethylcarbamoyl)-2,3,8-trichloroquinoxaline

A. 52.6 g. of 2-chloro-4-methylacetanilide is added at 20° C. to 160 ml. of 90 percent nitric acid. This reaction mixture is stirred for 3 hours at room temperature and then poured onto ice. The resulting precipitate is filtered and recrystallized from benzene to yield 23 g. of 2-chloro-4-methyl-6-nitroacetanilide, m.p. 192°–194° C.

17.4 g. of potassium permanganate is added to a solution of 8.4 g. of 2-chloro-4-methyl-6-nitroacetanilide in 33 ml. of pyridine and 26 ml. of water, the addition being carried out at 90° C. in six portions over a six hour period. The mixture is stirred for one hour after addition is complete, and is then filtered and the filtrate concentrated to a solid which yields 5.9 g. of 4-acetamido-3-chloro-5-nitrobenzoic acid, m.p. 225°–227° C.

24.8 grams of 4-acetamido-3-chloro-5-nitrobenzoic acid is refluxed in 300 ml. of constant boiling hydrochloric acid for two hours. The mixture is then cooled and the resulting solid filtered and recrystallized from acetonitrile to give 4-amino-3-chloro-5-nitrobenzoic acid. 10 grams of this latter material in 1500 ml. of ethanol is hydrogenated over 5 percent palladium-on-carbon catalyst. When the hydrogenation is complete, the catalyst is separated by filtration and the filtrate concentrated to dryness to yield 7 g. of 3-chloro-4,5-diaminobenzoic acid, m.p. 220°–225° C.

B. The product of part A above is treated according to the procedure of Examples 6B and 6C to give 6-(2-hydroxy-ethylcarbamoyl)-2,3,8-trichloroquinoxaline, m.p. 160°–162° C.

EXAMPLE 8

6-(2-Hydroxyethylcarbamoyl)-2,3,5-trichloroquinoxaline

A. 3-amino-2-chloro-4-nitrotoluene is converted to 3-acetamido-2-chloro-4-nitrotoluene by reaction with acetic anhydride as described in Example 6A. This latter material is then oxidized with potassium permanganate, deacylated and catalytically hydrogenated using the procedure of Example 7A to afford 2-chloro-3,4-diaminobenzoic acid.

B. The procedure of Examples 6B and 6C is followed using as starting material 2-chloro-3,4-diaminobenzoic acid to produce 6-(2-hydroxyethylcarbamoyl)-2,3,5-trichloroquinoxaline.

What is claimed is:

1. A compound of the formula:

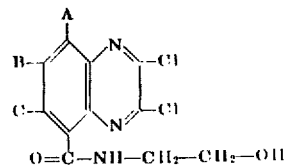

where A is methyl, chloro, or hydrogen, B is methyl, chloro, or hydrogen and C is chloro or hydrogen, provided that one and only one of A, B, and C is other than hydrogen.

2. The compound of claim 1 where A and B are hydrogen and C is chloro.

3. A compound of the formula:

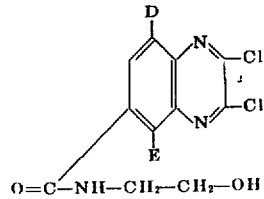

where D is methyl, chloro, or hydrogen, and E is chloro or hydrogen, provided that one and only one of D and E is other than hydrogen.

4. The compound of claim 3 where D is chloro.

* * * * *